Feb. 16, 1937.  H. O. PETERSON  2,070,681
OSCILLATORY CIRCUITS
Filed Dec. 17, 1932   3 Sheets-Sheet 1

INVENTOR-
H. O. PETERSON
BY
ATTORNEY-

Feb. 16, 1937.                 H. O. PETERSON                2,070,681
                             OSCILLATORY CIRCUITS
                           Filed Dec. 17, 1932           3 Sheets-Sheet 2

INVENTOR-
H. O. PETERSON
BY
ATTORNEY

Feb. 16, 1937.   H. O. PETERSON   2,070,681
OSCILLATORY CIRCUITS
Filed Dec. 17, 1932   3 Sheets-Sheet 3

INVENTOR-
H. O. PETERSON
BY
ATTORNEY-

Patented Feb. 16, 1937

2,070,681

UNITED STATES PATENT OFFICE 2,070,681

OSCILLATORY CIRCUIT

Harold O. Peterson, Riverhead, N. Y., assignor to Radio Corporation of America, a corporation of Delaware Application December 17, 1932, Serial No. 647,725

13 Claims. (Cl. 179—171)

This invention relates to oscillatory circuits such as used in the radio field and more specifically it relates to the magnetic control of multi-element vacuum tubes or electron discharge devices incorporated in such circuits.

Heretofore, the voltage impressed between various elements of conventional vacuum tubes or electron discharge devices such as the triode, tetrode, pentode, or other multi-electrode tubes have been used to control the flow of electrons from the electron emitting cathode to or through the other relatively cold electrodes of the tube. The principal object of my present invention is to provide an additional control for the flow of electrons within the tube and hence of the current in the circuits associated with the tube or tubes as the case may be, without adding elements to the mechanical construction of the tube itself. Briefly, to accomplish this object I provide an additional control in the form of a magnetic field applied substantially perpendicular to the direction of the electron flow within the tube.

Further and more specific objects of my present invention are to use this electromagnetic control for the frequency modulation of an electron discharge device oscillator and for the phase and/or amplitude modulation of conventional vacuum tube amplifiers having cylindrical cold electrodes surrounding a coaxial cathode.

Because of the fact that many elements within the tube or tubes controlled in accordance with my present invention are subjected to potentials different from that of the magnetic field structure, preferably in the form of a coil surrounding the tube or tubes, it will be found that the capacitive coupling between the tube elements and the coil will prove objectionable. To overcome this defect is a further object of my present invention and to do so I provide a conductor, between the coil and tube, maintained at a constant or preferably ground potential to eliminate such capacitive interaction. This feature of my present invention is not only useful in the types of tubes referred to wherein cold electrodes are unequally spaced from and subjected to different polarizing potentials with respect to the cathode, but is equally applicable to the known "Magnetron" system wherein one or more cold electrodes are equally spaced from the cathode and wherein those electrodes are subjected to identical unidirectional potentials.

While an attempt has been made to broadly define, in the appended claims, my present invention, it may best be understood as to its structural organization and mode of operation by referring to the accompanying drawings, wherein Figure 1 illustrates a radio transmitting system wherein signals may be transmitted by means of phase or frequency modulation with the aid of my improved magnetic control system;

Figure 1:
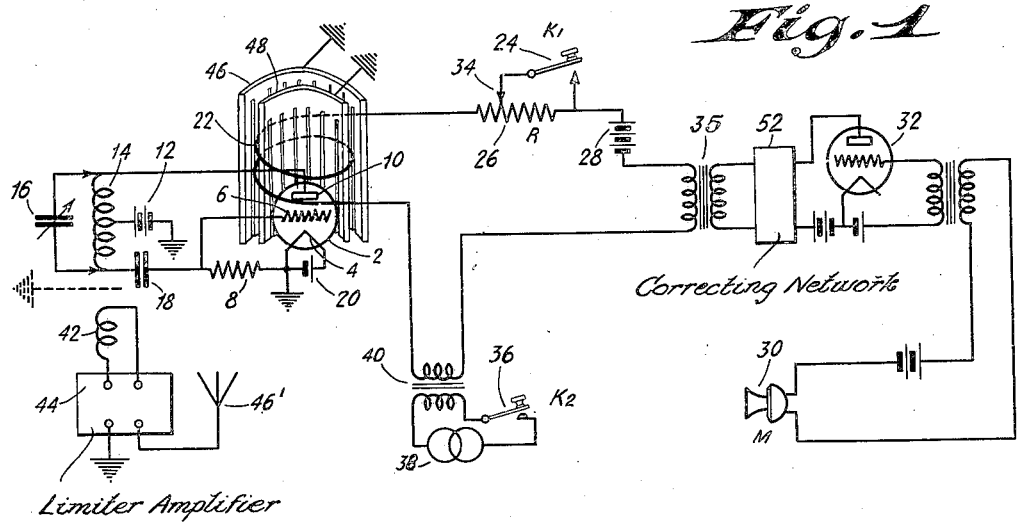
Figure 1a illustrates one embodiment of my invention in which there is provided a magnetic coil surrounding an electron-discharge tube, the structural arrangement of the elements being such that the electrons are emitted from the cathode of the tube in paths following planes perpendicular to the axis of the magnetic field produced by said coil.
Figure 3:
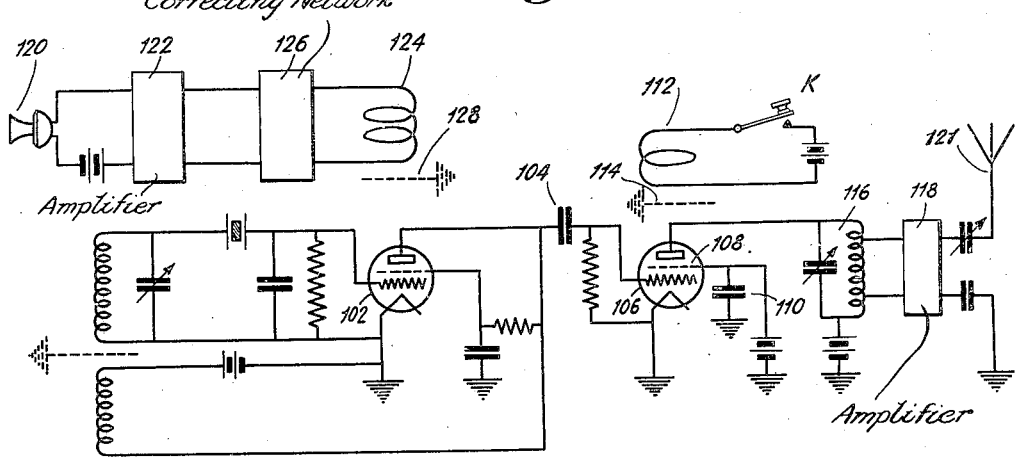
Figure 1A:
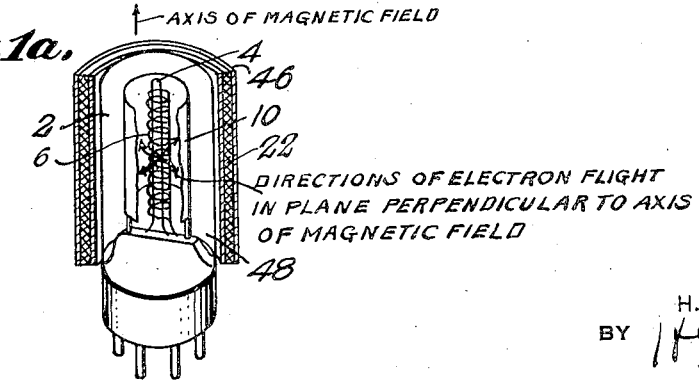
Figure 5:
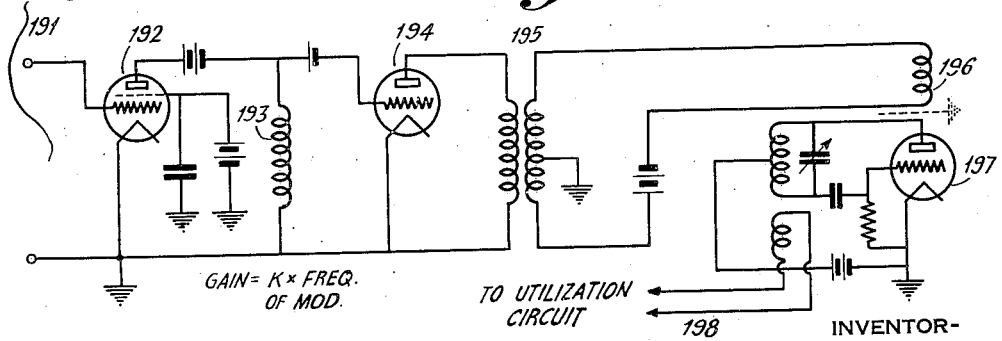
Figure 3A:
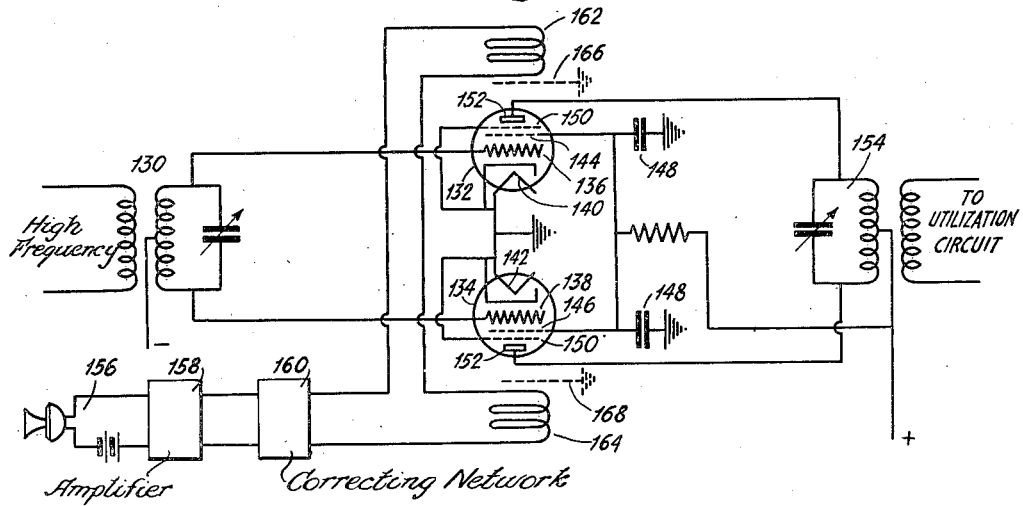
Figure 4:
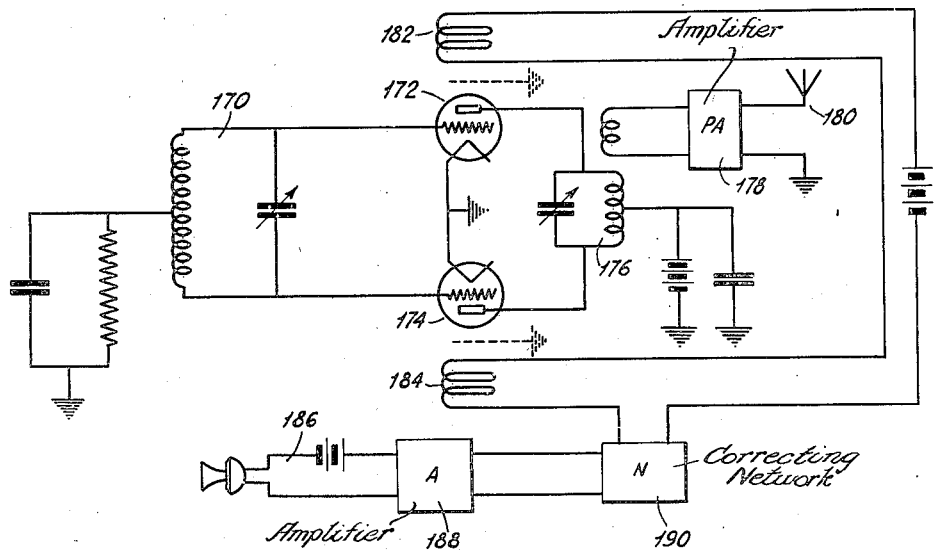

Figure 3, among other things, illustrates a system for magnetically controlling a tube of the tetrode type;

Figure 3a illustrates the manner in which a pushpull arrangement of pentode tubes may be magnetically controlled;

Figure 4 illustrates a modification wherein magnetic control is applied to a pushpull regenerative oscillation generator for varying the frequency thereof; and, Figure 5 illustrates a correcting network which may be used in connection with such systems as shown for example in Figures 1 and 4.

Turning to Figure 1, an electron discharge device or vacuum tube 2 has within an evacuated and hermetically sealed container indicated by the solid circular line, an electron emitting cathode 4, a control cold, or grid electrode 6 spaced therefrom and maintained at a suitable negative unidirectional potential with respect to the cathode by means of a resistor 8. Also within the container there is a further cold anode or plate electrode 10 more remote from the cathode 4 than the cold electrode 6 and subjected to a relatively high positive potential by the action of potential source or battery 12 supplying energy to the plate through inductance coil 14. Coil 14 is tuned to a desired mean operating frequency by variable condenser 16 in shunt with a portion of coil 14. Plate potential from source 12 is kept from the grid 6 by means of D. C. blocking or radio frequency by-passing condenser 18.

As so far described, and with cathode or filament 4 heated to an electron emitting condition by means of heating source 20, oscillations will be set up at a frequency approximately corresponding to the tuning of parallel tuned circuit 14, 16.

In order to vary either the phase, the frequency, or the amplitude of currents flowing in circuit 14, 16, an electromagnet having a solenoid or coil 22 is either wrapped about or arranged to surround tube 2 so that the magnetic lines of force running parallel with the axis of the coil and preferably those lines of force within the coil itself are disposed perpendicularly to the planes which are traversed by electrons in their flight from cathode 4 to plate 10.

For sending keyed signals by means of frequency modulation, a key 24 in shunt with a portion of resistance 26 is provided. Obviously, closure of key 24 will remove a portion of resistance 26 from circuit thereby allowing greater current to flow through the solenoid 22 from solenoid energizing source or battery 28.

It is believed that, due to varying strengths of magnetic field applied to the electrons flowing within the tube 10, that they are curled up to a greater or less degree about the cathode 4. Consequently, depending upon the strength of current flowing through the solenoid, the electrons are in various degrees of proximity with respect to the cold electrodes of tube 2 as a result of which time lag within the tube is increased or decreased in accordance with current flowing through the solenoid. In this manner the frequency of oscillations generated by tube 10 is changed.

In the alternative, in connection with Figure 1, for voice signaling a microphone 30 is provided. The microphone output is amplified by means of a suitable audio frequency amplifier 32 whose output voltages are superimposed upon the voltage of source 28 by means of transformer 35, as a result of which, the intensity of current flowing through solenoid 22 is varied. When signaling by voice, key 24 may be left closed and tapping point 34 adjusted to a desired current flow condition through the solenoid.

Still further in the alternative, signaling may be carried on by means of a second key 36, keying tone oscillations from a source 38. The keyed tone is also superimposed upon the voltage from source 28 for solenoid 22 through a transformer 40. Output energy may be derived from the circuit 14, 16 by means of an output secondary coil 42 inductively coupled to and capacitively shielded from coil 14. The output energy may be utilized in any suitable manner and, for example, may be frequency multiplied, amplified, or limited by an appropriate network 44 before being fed into radiating antenna 46'.

It goes without saying, that multiplex signaling may be carried out, for example, by providing a plurality of tone generators 38 together with a plurality of keys 36, each tone generator being operated at a different frequency. Or, tone generator 38 may be operated at a superaudible frequency and multiplex signaling code and voice may be carried on by key 36 and microphone 30 simultaneously. Also, if desired, a portion of the audio frequency energies may be applied to, for example, the grid circuit of tube 2 so as to have simultaneous magnetic and grid voltage control.

The output radiated from antenna 46' upon actuation of key 24 will be a frequency modulated wave, accompanied by some amplitude modulation which may or may not be desirable. If undesirable, it may be eliminated by use of a limiter 44.

Actuation of key 36 and/or microphone 30 will cause the output energy in antenna 46' to be either phase or frequency modulated with some amplitude modulation which also, as indicated, may be eliminated by the use of amplifiers 44 excited so as to run beyond their saturation points. Whether or not the antenna output will be phase or frequency modulated will depend upon the ratio of $Fd$ to $Fm$ where $Fd$ indicates the actual number of cycles the oscillator 20 is swung from a mean carrier frequency, and wherein $Fm$ is the number of times per second that the frequency is swung plus or minus from a mean carrier frequency. It will be found for certain ratios, the antenna energy will be phase modulated and for other values of the ratio it will be found that the energy is frequency modulated.

As a further explanation of the operation of the arrangement shown in Figure 1, it may be that due to the various distributions or placings of electrons within the tube with different values of magnetic field, that the modulating action is due to a variable capacity effect. Accordingly, it will be found that in order to insure that capacity variations be due to electron cloud arrangements within the tube, and not to undesired external factors, it will be well to shield coil 22 electrostatically from the tube by means of open-ended, slotted, concentric, cylindrical shields 46, 48 grounded as indicated. If desired, the shields may be maintained at some unidirectional potential either above or below ground potential by insertion of polarizing batteries in the grounding leads.

Also, in the event that the tube or tubes, as the case may be, is operated at extremely high frequencies such that the grounding leads for the shields present appreciable impedance or reactance at those frequencies, condensers may be inserted in the leads to series resonate with the inductance of the leads so as to maintain the shields at ground potential. This is more fully described in my copending application, Serial Number 640,384, filed October 31, 1932. As indicated, the shield 48 is placed within the coil 22 and between it and tube 2 whereas shield 46 is placed around the coil. The shields are left open-ended so as to allow magnetic lines of flux to circulate through the annular space between the shields and through the tube. To increase permeability and hence magnetic filed strength, the inner shield 48 may be closed at both ends and filled as closely as possible up to tube 2 with a suitable magnetic material such as soft iron.

Further, in connection with the arrangement shown in Figure 1, in order to insure a final frequency deviation proportional to the frequency of applied modulation, a correcting network 52 may be inserted between the amplifier 32 and transformer 35. Such a frequency correcting network is illustrated in Figure 5 and will be described more fully later.

Figure 2:
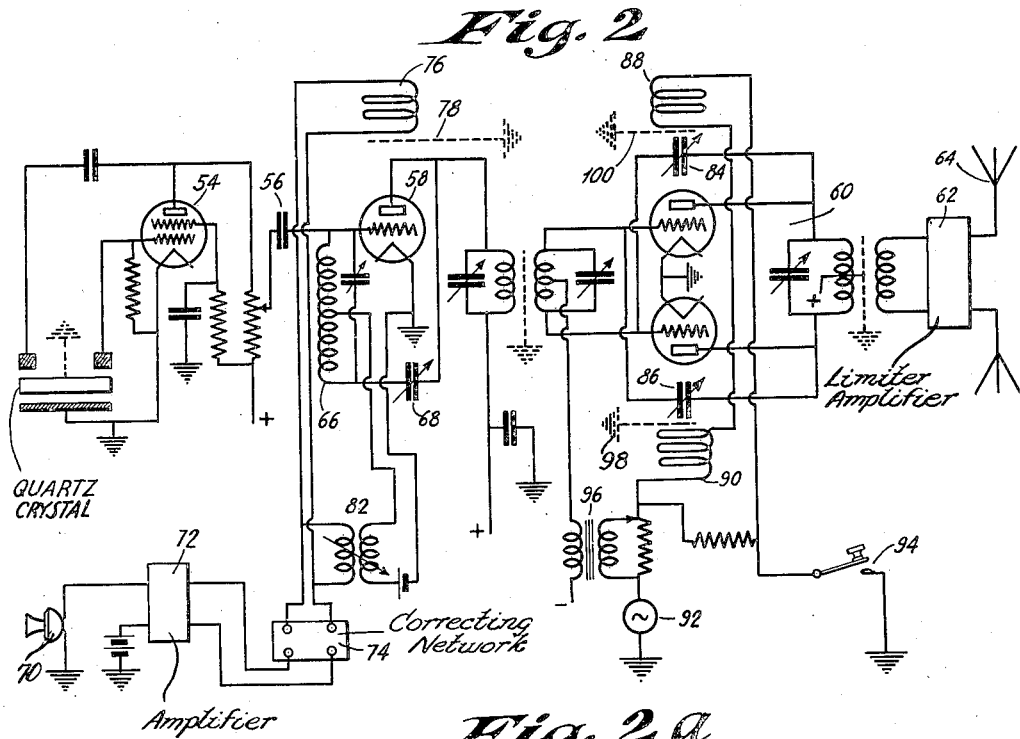
Figure 2 illustrates a similar system wherein signals are transmitted by amplitude modulation.

In the arrangement shown in Figure 2 constant high frequency oscillations are generated by a crystal controlled oscillation generator 54 of the type described by James L. Finch in his copending application Serial Number 531,684, filed April 21, 1931, or which may be of the type described in my copending application Serial Number 596,197, filed March 2, 1932, patented October 2, 1934, No. 1,975,615. Crystal controlled oscillator energy is fed through blocking condenser 56 to a modulator amplifier 58 consisting of a single tube having a circuit to prevent the effects of interelectrode feed back. Tube 58 may be operated simply as an amplifier to feed a succeeding pushpull stage 60 which may or may not be modulated as desired. Before final radiation of the modulated energy by antenna 64, it may be fed through the network 62 for purposes either of amplification, frequency multiplication, or limiting, whichever may be needed.

Turning back to amplifier and/or modulator tube 58, the effects of interelectrode feed back from the anode to control grid are prevented by means of the circuit consisting of divided input coil 66 and neutralizing condenser 68. Modulating currents from a microphone or other audio frequency or low frequency signaling source 70 and amplified by low frequency amplifier 72, are fed through a correcting network 74 and applied to solenoid 76 arranged about tube 58 in a manner similar to that which solenoid 22 of Figure 1 has been described arranged about tube 2 of that figure. The shielding for solenoid 76 is diagrammatically indicated by the astatic grounded shield 78. With modulating currents from source 70 fed to coil 76, the output of amplifier tube 58 will be amplitude and phase modulated. The modulation as to amplitude may be accentuated by applying a portion of the energies through variable transformer 82 to the grid of tube 58. Any desired adjustment of transformer 82 may be used as, for example, with a weakening of the magnetic field of coil 76, the bias on the grid of tube 58 may be rendered more or less negative.

Similarly, the pushpull stage 60 is provided with neutralizing condensers 84, 86 as shown to prevent the effects of interelectrode feed back. A keyed tone may be applied to the magnetic field coils 88, 90 through the action of tone generator 92 and key 94. The amplitude modulation may further be adjusted by means of variable transformer 96 applying a portion of the keyed tone energy to the grids of the tubes forming the pushpull neutralized amplifier stage 60.

For the pushpull stage also, grounded shields 98; 100 are provided to prevent capacitive coupling between the control magnetic field coils and the tube elements of the pushpull tubes forming stage 60.

Figure 2A:
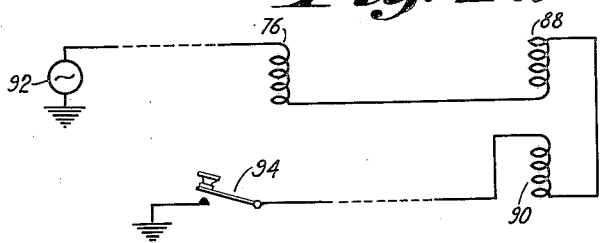
Figure 2a illustrates a circuit for the simultaneous magnetic modulation of a plurality of cascaded stages.

In the alternative, the field control coils 76, 88 and 90 may be simultaneously energized and to do so they may be connected as shown in Figure 2a where, for example, a tone source 92 is used keyed by key 94 such as shown in Figure 2. Only the field structure has been shown in Figure 2a in order to reduce the number of detailed circuits illustrated herein.

A system for producing primarily amplitude modulated waves by the use of the magnetic control system of my present invention, is illustrated in Figure 3. Oscillations from a crystal controlled oscillator 102 are fed through condenser 104 to my improved modulator amplifier 106 of the tetrode type. The screen grid 108 of tube 106 is grounded by means of condenser 110 or where exceedingly high frequencies are encountered by means of a condenser 110 of such a value as to series resonate with the screen grid lead inductance. By varying the current flowing through solenoid 112, electrostatically shielded from the tube and its associated circuits by means of grounded shield 114, the output in output circuit 116 will be amplitude modulated. This energy may be further amplified in a power amplifier 118 before radiation over antenna 121.

In the alternative, the arrangement shown in Figure 3 may be used for frequency modulation, modulating potentials from source 120 amplified by amplifier 122 being brought to act magnetically upon the oscillator tube 102 through the magnetic coil 124. A correcting network 126 may be provided and, preferably, the coil 124 is electrostatically shielded from the oscillator by means of grounded shield 128.

While the frequency shift in the output circuit of oscillator 102 will be slight, use of suitable frequency multiplier stages 118 will increase the frequency shift to an extent sufficient for operating a frequency modulation receiver.

A magnetic amplitude modulator using pushpull connected pentode tubes is illustrated in Figure 3a. Oscillatory energy is fed from a suitable source (not shown) through input transformer 130 in phase opposition to the control grids 136, 138 of the pentode tubes 132, 134 having cathodes 140, 142 of the indirectly heated type. To regulate interelectrode feed back, screen grids 144, 146 suitably grounded by means of condensers 148 are provided. The suppressor grids 150 connected to the cathodes act to prevent secondary emission from the anodes 152. An output circuit 154 is coupled to the anodes and this circuit feeds any suitable utilization circuit as shown.

To produce a phase modulated output in circuit 121, Figure 3, modulating potentials, from source 120 are amplified by amplifier 122, and fed, through frequency correcting network 126 to the magnetic field coil 124. The field coil is electrostatically isolated from the tubes and the other circuits by means of electrostatic shield 128, appropriately grounded. The modulating effect may be explained by considering that the magnetic field tends to curl the electrons around the electron emitting surfaces, and for sufficient values of field strength will prevent an appreciable number of electrons from ever reaching the anodes. That is to say, with a sufficiently strong magnetic field, many electrons are caused to circulate within the tube on radii smaller than the internal diameter of the anode. With a weaker field, of course, the path of travel of the electrons becomes larger as a result of which the tube impedance is changed and the frequency of oscillation affected.

In phase modulation the range of carrier phase deviation is, for a given intensity of modulation, constant regardless of modulation frequency. In normal frequency modulation the range of carrier phase deviation for a given intensity of modulation is inversely proportional to the modulation frequency. In both cases the range of carrier phase deviation is proportional to the intensity of modulation. Consequently, I can by frequency modulation methods, produce phase modulated output if I interpose a frequency discriminating circuit between the source of modulation (usually a microphone) and the frequency modulating device. One form of such frequency discriminating circuit is shown in Figure 5. In this circuit the modulation voltages are applied to the grid 191 of amplifier 192. The internal impedance of this tube is high compared with the reactance of inductance 193 at any of the modulating frequencies utilized It follows that for a given amplitude of modulation applied at grid 191 the voltage across inductance 193 will be proportional to the frequency of that modulation since the reactance of an inductance increases with frequency. Consequently, the excitation applied to the grid of amplifier 194 will be proportional to the frequency of the modulation voltage, and amplifier 194 operating through transformer 195 and field coil 196 will now produce a phase modulated output since the normal tendency toward greater carrier phase deviation at lower modulating frequencies has been compensated.

A pushpull connected oscillator frequency modulated in accordance with the teachings of my present invention, is illustrated in Figure 4. Parallel tuned circuit 170 is connected in phase opposition to the control electrodes or grids of tubes 172, 174. Similarly, the parallel tuned output circuit 176 is connected in phase opposition to the plates or anodes of the tubes 172, 174. Oscillations are regeneratively set up by virtue of the fact that the circuits 170, 176 are reactively associated with one another through the interelement capacity of the tubes 172, 174. If desired, by the use of screen grid tubes the interelement capacity may be completely eradicated and adjustable feed back obtained by connecting variable condensers across the control grid and plate of each tube. In the alternative, or in addition, variable tickler coils may be connected in series with the anode leads, the coils being inductively coupled to the inductance coil of the grid circuit 170. Output energy is fed inductively as illustrated from output circuit 176 to the network 178 which serves either as a power amplifier, frequency multiplier, or limiter. The energy is then applied to radiating antenna 180.

Modulating currents are fed to the field coils 182, 184 from source 186, audio frequency amplifier 188 and correcting network 190 such as described in connection with Figure 5. Coils 182, 184 may be so orientated as to apply fields of like direction to each tube, or, if desired, may be arranged so that the magnetic fields traversing the electron streams of the tubes are in opposite directions. In either event, the output appearing in circuit 176 will be frequency modulated in accordance with the frequency and amplitude of the modulating potentials from source 186.

Having thus described my invention, what I claim is:

1. In electrical apparatus, an electron discharge device having an electron emitting cathode and a plurality of relatively cold electrodes unequally spaced from and subjected to different polarizing potentials relative to said cathode, circuits interconnecting said cold electrodes and said cathode and forming therewith an oscillation generator, magnetic apparatus for applying a magnetic force to the electrons flowing from said cathode, and means including electrostatic shielding means between said magnetic apparatus and said electron discharge device for producing substantially pure phase modulation of the current in said circuits.

2. In electrical apparatus, an electron discharge device having an electron emitting cathode and a plurality of cold electrodes unequally spaced from and subjected to different polarizing potentials with respect to said cathode, circuits interconnecting said cold electrodes and cathode whereby said device generates oscillatory energy of substantially constant frequency, variable magnetic apparatus applying a magnetic field to the electrons flowing within said device for varying substantially only the frequency of oscillations generated by said device, and means for eliminating amplitude variations in said frequency varied oscillations.

3. In combination, an electron discharge device having within an hermetically sealed container, an electron emitting cathode and a plurality of cold electrodes, circuits interconnecting said cold electrodes and said cathode, a source of substantially constant frequency alternating current coupled to one of said circuits, a utilization circuit coupled to another of said circuits, means including an electromagnet for applying a variable magnetic field to the electrons flowing within said device, and electrostatic means for enabling the electromagnetic means to produce a phase shift independently of amplitude variations in the energy fed from said source into said utilization circuit.

4. In electrical apparatus, an electron discharge device having within an hermetically sealed container an electron emitting cathode and a plurality of cold electrodes spaced therefrom, circuits interconnecting said cold electrodes and cathode, an electromagnet in proximate relation to said device whereby the magnetic field of said electromagnet acts upon the electrons flowing within said device, and means including a grounded conductive member interposed between said electromagnet and said device for obtaining a substantially pure frequency-modulating influence of said magnetic field upon the oscillating current flow in said device.

5. In electrical apparatus, a vacuum tube having an electron emitting cathode and a plurality of cold electrodes unequally spaced from said electron emitting cathode, one of said cold electrodes being subjected to a negative potential with respect to said cathode and another of said cold electrodes being subjected to a positive potential with respect to said cathode, circuits interconnecting said cold electrodes and said cathode, said circuits being reactively so coupled together that oscillations are set up by said device of substantially fixed frequency, an electromagnet comprising a coil in close proximity to said device whereby the field of said coil acts upon the electrons flowing within said device, a modulation circuit for varying the current flowing through said coil and means including an electrostatic member interposed between the coil of said electromagnet and its field of influence upon the electron stream within said tube for rendering that influence substantially purely magnetic, and for effecting substantially pure phase modulation of the current flow in said vacuum tube.

6. In apparatus of the character described, a pair of vacuum tubes each having a grid, a filament and a plate, a circuit interconnecting the grids in phase opposition, an oscillatory circuit connected to the plates of said tubes, means for impressing high-frequency oscillations upon the grids of said tubes, and, a circuit for controlling the phase of said oscillations, said circuit comprising a magnetic coil energized and arranged to apply a variable magnetic field upon electrons flowing in at least one of said devices.

7. In apparatus of the character described, a pair of vacuum tubes each having a grid, a filament and a plate, a circuit interconnecting the grids in phase opposition, an oscillatory circuit connected to the plates of said tubes, means for impressing high-frequency oscillations upon the grids of said tubes, a circuit for controlling said oscillations, said circuit comprising a magnetic coil energized and arranged to apply a variable magnetic field upon electrons flowing in at least one of said devices, and an electrostatic shield interposed between said coil and said devices for substantially precluding electrostatic coupling therebetween.

8. In electrical apparatus, an electron discharge device having an electron emitting cathode and a plurality of relatively cold electrodes unequally spaced from and subjected to different polarizing potentials relative to said cathode, circuits interconnecting said cold electrodes and said cathode having currents flowing therein at substantially the same frequency, magnetic apparatus for applying a magnetic field to the electrons flowing from said cathode to the cold electrodes of said device, a source of modulating currents, means including a frequency correcting network for eliminating amplitude distortion in said modulating currents, means for causing said modulating currents to be applied to said magnetic apparatus through said frequency correcting network, and means for causing the currents flowing in said circuits interconnecting said cold electrodes to be frequency-modulated in accordance with the purely inductive effect of said modulating currents.

9. In combination, an oscillation generator generating waves of substantially constant frequency, a multi-electrode amplifier coupled to said generator and amplifying waves from said generator, a utilization circuit coupled to output electrodes of said amplifier, a circuit for applying a magnetic field to electrons flowing within said multi-electrode amplifier, a source of modulating currents, and means for varying the strength of the magnetic field produced by said magnetic circuit in accordance with currents from said modulating current source.

10. In combination, an oscillation generator producing waves of substantially constant frequency, a multi-electrode tube amplifier coupled to said oscillation generator for amplifying the waves generated thereby, a utilization circuit coupled to output electrodes of said multi-electrode tube amplifier, a circuit for applying a magnetic field to electrons flowing within said tube amplifier, a source of modulating currents, a frequency correcting network, means for feeding currents from said modulating source through said frequency correcting network to said magnetic circuit in such manner that phase modulation of the oscillations in said tube amplifier results, and means for so restricting the effects of said modulating currents upon said tube amplifier that distortion due to frequency-modulation and amplitude modulation of said oscillations is substantially eliminated.

11. In combination, a multi-electrode tube, circuits interconnecting electrodes of said tube, one of said circuits including an electromechanical vibrator whereby oscillations of substantially constant frequency are generated by said multi-electrode tube, a coil arranged in close proximity to said tube, and means for varying the current flow through said coil, said coil being so disposed with respect to said tube as to apply a variable magnetic field to the electron flow within said tube and hence vary the characteristic of the output of said tube generator.

12. Electrical apparatus comprising a multi-electrode tube, circuits including a mechanical vibrator interconnecting said electrodes whereby oscillations of substantially constant frequency are generated by said tube, a coil, and means for causing current flow through said coil, said coil being arranged in close proximity to said tube and in such a direction as to apply the magnetic field generated thereby at substantially right angles to the direction of flow of electrons within said tube.

13. In electrical apparatus, a multi-electrode tube, circuits including a piezo-electric crystal interconnecting the electrodes of said tube whereby oscillations of substantially constant frequency are generated by said tube, a source of modulating currents, a frequency correcting network connected to said source, and a coil connected to said frequency correcting network, said coil being so arranged as to apply a magnetic field to said tube in a direction normal to the direction of flow of electrons within said tube whereby the varying field produced by said coil varies a characteristic of the output of said crystal controlled tube generator.

HAROLD O. PETERSON.